United States Patent [19]

Krutsch

[11] 4,370,654
[45] Jan. 25, 1983

[54] APPARATUS FOR PRODUCING A FREQUENCY CHANGE OF A WAGE PROPAGATING SIGNAL

[76] Inventor: Thomas E. Krutsch, 12745 Moorpark St., Studio City, Calif. 91604

[21] Appl. No.: 115,776

[22] Filed: Jan. 25, 1980

[51] Int. Cl.³ .................. G02B 5/122; H01Q 15/18
[52] U.S. Cl. .................. 343/18 D; 343/18 C; 343/18 B; 350/99
[58] Field of Search ............ 343/18 B, 18 C, 18 D; 350/99

[56] References Cited

U.S. PATENT DOCUMENTS

| | | | |
|---|---|---|---|
| 1,937,504 | 12/1933 | Bates | 350/99 |
| 2,443,643 | 6/1948 | Schelleng | 343/18 D X |
| 2,472,212 | 6/1949 | Hudspeth | 343/18 D X |
| 2,503,509 | 4/1950 | Rader | 350/99 |
| 2,592,238 | 4/1952 | Brammer | 350/99 |
| 2,823,365 | 2/1958 | Rines | 343/18 B X |
| 3,010,103 | 11/1961 | Hopper et al. | 343/18 C X |
| 3,010,104 | 11/1961 | Powell | 343/18 C X |
| 3,417,398 | 12/1968 | Lewis et al. | 343/18 C X |
| 3,894,786 | 7/1975 | Nagel | 350/99 |
| 3,963,307 | 6/1976 | Kirk | 350/99 |

Primary Examiner—Malcolm F. Hubler
Attorney, Agent, or Firm—W. Edward Johansen

[57] ABSTRACT

The present invention is an apparatus for producing a frequency change of wave propagating energy including microwave radar beams, electro-optical signals, other electro-magnetic signals, acoustic signals, and other wave propagating energy. In the first embodiment the apparatus includes a self-directive reflecting device which may be a plurality of trihedral corner reflectors, Luneberg lenses, etc., and a motion imparting device for imparting motion to the reflecting device. The motion imparting device includes a supporting member and an axial member which is rotatably coupled to the supporting member. The motion imparting device also includes a mounting member which is rigidly coupled to the axial member and on which the plurality of corner reflectors are mounted. In the second embodiment the apparatus includes a self-directing reflecting device and an intermediate reflecting device for reflecting the incoming wave propagating energy from its source toward the self-directing reflecting device and reflecting the wave propagating energy returning from the self-directing reflecting device back toward its source. The apparatus also includes a motion imparting device for imparting motion to the intermediate reflecting device relative to the structure on which the apparatus is mounted. The motion imparting device includes a support member, an axial member which is rotatably coupled to the support member and a mounting member which is rigidly coupled to the axial member and on which the intermediate reflecting device is mounted.

2 Claims, 7 Drawing Figures

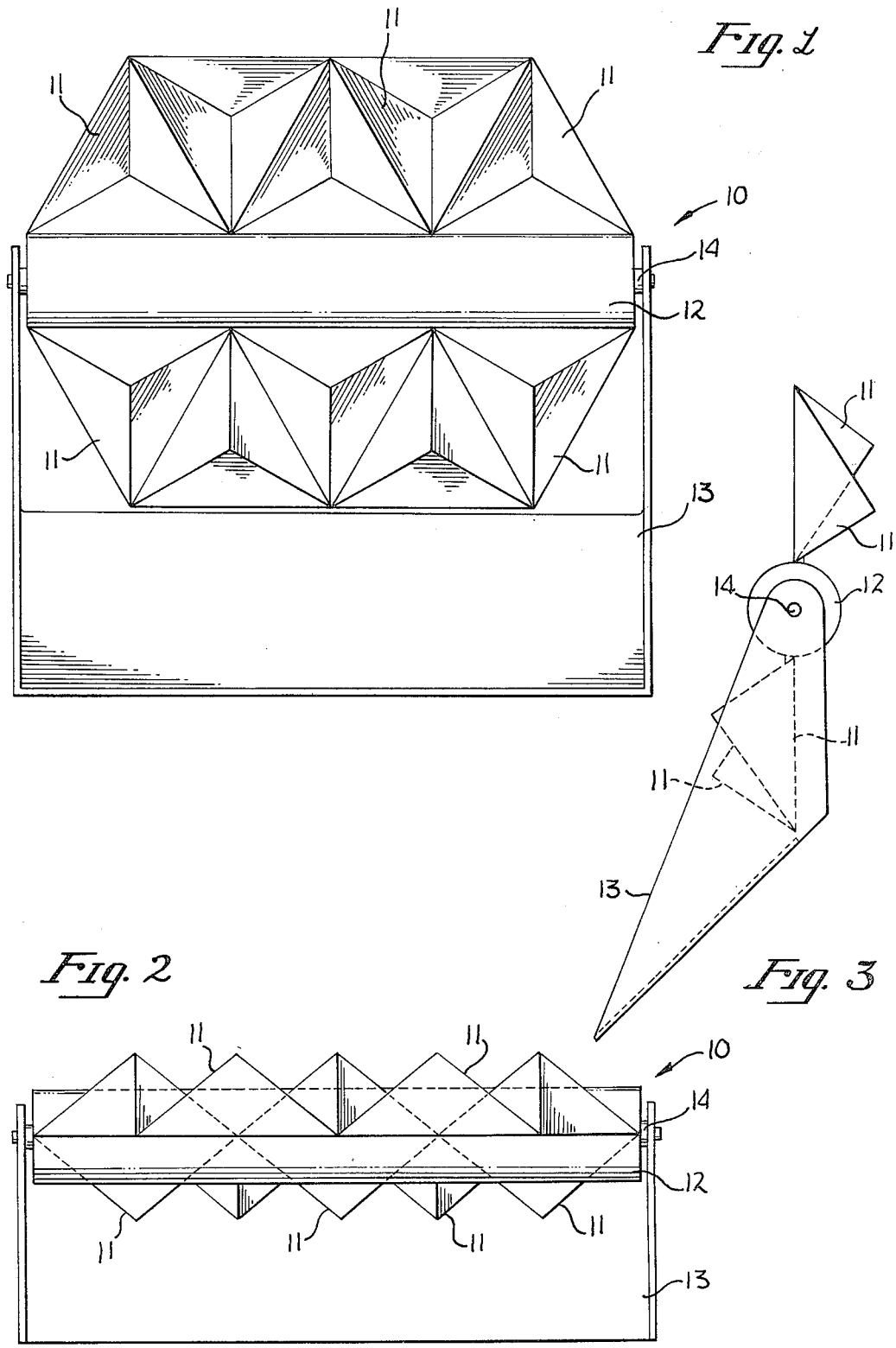

APPARATUS FOR PRODUCING A FREQUENCY CHANGE OF A WAGE PROPAGATING SIGNAL

BACKGROUND OF THE INVENTION

1. Field of the Invention

The present invention relates to decoys and targets of microwave radar systems and more particularly to microwave radar systems which utilize the principles of Doppler shift for moving target indication and/or velocity calculation, etc.

2. Description of the Prior Art

Much of the prior art in the field of electronic counter-measures for radar systems is has a secrecy restriction within the U.S. Patent Office. The inventor has searched the files of the U.S. Patent Office for the best available prior art.

In his article, entitled *Targets for Microwave Radar Navigation,* Sloan D. Robertson wrote about the effective echoing areas of certain radar targets and how these areas could be calculated. He published his article in the *Bell System Technical Journal,* Volume 28, Issue 4, October, 1947, on pages 852 through 869.

U.S. Pat. No. 3,010,103, entitled Radar Reflective Tow Target, issued to Robert J. Hopper and Orson B. Lolmaugh on Nov. 21, 1961, teaches an aerial tow target for training pilots in the use of equipment for detecting and tracking aerial targets and the use of various automatic equipment for such purposes as fire control, missile launching control and target interception. These two targets were relatively inexpensive in comparison to the cost of drone airplanes. The two targets used a plurality of corner reflectors for reflecting the radar beams.

In his article entitled Radar Targets: How Objects Look to Radio-Wave Eyes, M. W. Hosking wrote about the purpose of a radar system which is to obtain information about its target and in many cases to try and differentiate between, or identify, several objects which may have reflected the system's questing beam. He published his article in *Wireless World* in March, 1976 on pages 44 through 47.

U.S. Pat. No. 2,823,376, entitled Stringer Radar Reflective Tow Targer, issued to Robert P. Baldwin and Raymond H. Eckert on Feb. 11, 1958, teaches a method of making an improved tow target which is not only more stable in flight in relation to its light weight, but has a mechanism which controls the magnitude and dispersal of radar beams reflected from the tow target. The improved tow target includes a plurality of reflecting surfaces, which are disposed along its longitudinal axis, and rotates about its longitudinal axis, in order to disperse the reflected energy.

U.S. Pat. No. 3,016,532, entitled Tow Target, issued to Bruce E. Del Mar on Jan. 9, 1962, teaches an aerial target to be towed by aircraft for military training purposes as well as for carrying out various tests and experiments. The tow target includes a plurality of corner reflectors which are circumferentially arranged and a mechanism for rotating the plurality of corner reflectors. The object of this rotation is to cause the intensity of the overall radar reflection to pulsate at a frequency which is equal to the revolutions per minute of the rotating corner reflectors.

U.S. Pat. No. 3,010,103 also teaches that the dimension of its larger reflector should be at least $6\frac{1}{2}$ times the wave length of the radar signals in order to effect monostatic reflection. In view of the size constraints of decoys and tow targets it would be beneficial to reduce the size of the reflectors.

U.S. Pat. No. 4,101,736, entitled Device for Increasing the Compliance of a Speaker Enclosure, issued to Eugene J. Czerwinski on July 18, 1978, teaches the use of a gas having a gamma less than 1.4 and the product of its density and the square of the speed of sound therein less than the same product for air in a soft, pliable bag thereby increasing the acoustical size of the speaker without increasing the physical size of the speaker.

The inventor realizes that there may be patents describing systems for decoys which are maintained within the secret and restricted status. The inventor also realizes that an apparatus which defeats radar systems by misleading them about a radar target's present speed may also be restricted by a secrecy order. Nonetheless the inventor envisions many practical uses of his apparatus.

SUMMARY OF THE INVENTION

In view of the foregoing factors and conditions characteristic of the prior art it is the primary object of the present invention to provide an apparatus which produces a Doppler shift in the frequency of a microwave beam from a radar system.

It is another object of the present invention to provide an apparatus which may be used as an inexpensive electronic counter measure to a radar system in that the apparatus may be used to mislead a radar system as to the speed of an aircraft or other vehicle on which the apparatus is mounted.

It is still another object of the present invention to provide an apparatus which may be used as a decoy which simulates a moving target aircraft or ground vehicle.

In accordance with an embodiment of the present invention an apparatus for producing a frequency change of wave propagating energy including microwave radar beams, electro-optical signals, other electromagnetic signals, acoustic signals, and other propagating energy. In the first embodiment the apparatus includes a self-directive reflecting device which may be a plurality of trihedral corner reflectors, Luneberg lenses, etc., and a motion imparting device for imparting motion to the reflecting device. The motion imparting device includes a supporting member and an axial member which is rotatably coupled to the supporting member. The motion imparting device also includes a mounting member which is rigidly coupled to the axial member and on which the plurality of corner reflectors are mounted. In the second embodiment the apparatus includes a self-directing reflecting device and an intermediate reflecting device for reflecting the incoming wave propagating energy from its source toward the self-directing reflecting device and reflecting the wave propagating energy returning from the self-directing reflecting device back toward its source. The apparatus also includes a motion imparting device for imparting motion to the intermediate reflecting device relative to the structure on which the apparatus is mounted. The motion imparting device includes a support member, an axial member which is rotatably coupled to the support member and a mounting member which is rigidly coupled to the axial member and on which the intermediate reflecting device is mounted.

The features of the present invention which are believed to be novel are set forth with particularity in the appended claims.

Other objects and many of the attendant advantages of this invention will be more readily appreciated as the same becomes better understood by reference to the following detailed description and considered in connection with the accompanying drawing in which like reference symbols designate like parts throughout the figures.

DESCRIPTION OF THE DRAWING

FIG. 1 is a front elevational view of an apparatus for producing a change of the frequency of a wave propagating signal which has been constructed in accordance with the principles of the first embodiment of the present invention.

FIG. 2 is a top plan view of the apparatus for producing a change of the frequency of a wave propagating signal of FIG. 1.

FIG. 3 is a side elevational view of the apparatus for producing a change of the frequency of a wave propagating signal of FIG. 1.

DESCRIPTION OF THE PREFERRED EMBODIMENT

Figure 4:
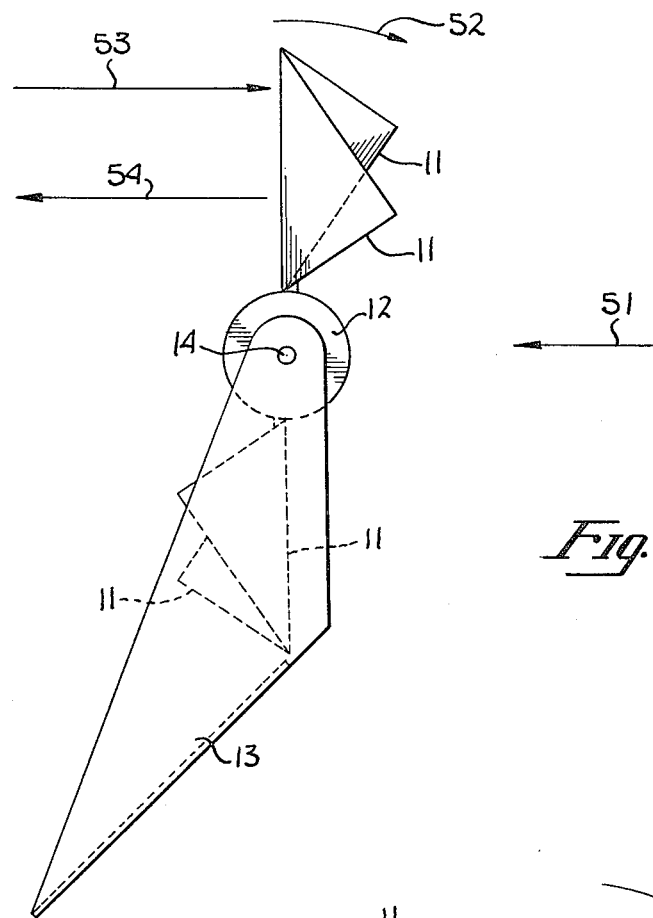
FIG. 4 is a schematic drawing of the apparatus for producing a change of the frequency of a wave propagating signal of FIG. 1 where a radar beam strikes each reflector of the apparatus directly.

In order to best understand the present invention it is necessary to refer to the following description of its preferred embodiment in conjunction with the accompanying drawing. Referring to FIG. 1 an apparatus 10 for producing a change of the frequency of a wave propagating signal includes a plurality of triangular trihedral corner reflectors 11 and a longitudinal member 12 on which the corner reflectors 11 are disposed. The apparatus 10 also includes a mounting member 13 which has a rectangular base and a pair of parallel sidewalls which are orthogonally disposed to its rectangular base and an axial member 14 which rotatably couples the longitudinal member 12 to the mounting member with the longitudinal member 12 being disposed orthogonally to the parallel sidewalls and parallelly to the base of the mounting member 13.

U.S. Pat. No. 3,010,103, entitled Radar Reflective Tow Target, issued to Robert J. Hopper and Orson B. Lolmaugh on Nov. 21, 1961, teaches an aerial tow target which uses a plurality of triangular trihedral corner reflectors to form a radar reflective target.

U.S. Pat. No. 2,489,653 and U.S. Pat. No. Re. 23,323, entitled Rotatable Tremulant Sound Producer, issued to Donald J. Leslie on Nov. 29, 1949, and reissued on Jan. 9, 1951, teaches a rotating sound emitting horn which produces a Doppler shift in the frequency of sound waves which it produces.

The inventor stresses that it is his use of the self-directing reflectors, such as the plurality of trihedral corner reflectors 11, in combination with the rotating longitudinal member 12, and the passive nature of the apparatus 10 which provide many of the unique advantages of the invention over presently used electronic countermeasures.

Referring to FIG. 2 in conjunction with FIG. 1 and FIG. 3 the apparatus 10 includes a number of radar reflective elements which are the trihedral corner reflectors 11 that have been assembled into an array. This array of the corner reflectors 11 is mounted on the longitudinal member 12 so that it may be rotated on the axial member 14 by a motor or by air flow due to the vehicle's speed, or by other suitable mechanisms. The mounting member 13 assists in directing the radar energy to the radar reflective elements.

Figure 5:
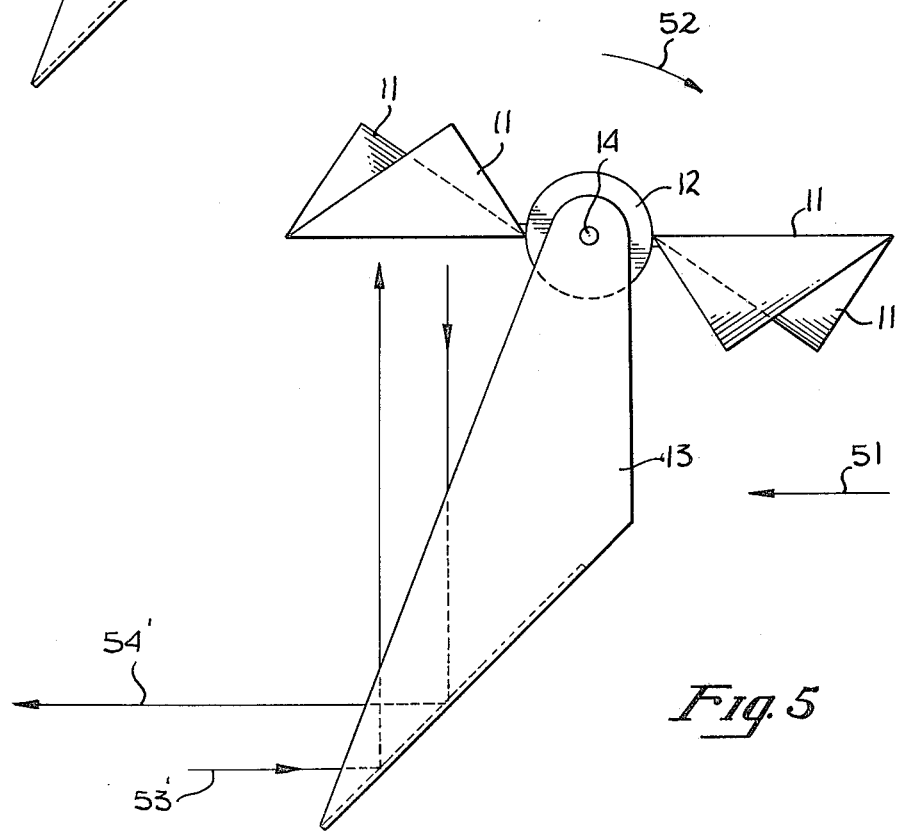
FIG. 5 is a schematic drawing of the apparatus for producing a change of the frequency of a wave propagating signal of FIG. 1. where a radar beam strikes the mounting member of the apparatus and is reflected thereby against each reflector of the apparatus.

Referring now to FIG. 4 and FIG. 5 the apparatus is shown in operation when mounted on an aircraft which is moving in the direction of the arrow 51. The reflective arrays are rotating in the direction of the arrow 52. The incoming radar beam from a distant source is traveling in the direction of the arrows 53 and 53'. The outgoing radar beam is shown traveling in the direction of the arrows 54 and 54'.

The following briefly describes the preferred embodiment of the present invention, which is suitable for placement on or in an aircraft or other vehicle, with the object of inducing spurious Doppler shift into the echo which is returned from the vehicle to a radar installation, thus giving the radar misleading information as to speed of the vehicle.

As shown in FIG. 1, a number of radar reflective elements, which are in this embodiment trihedral corner reflectors 11, are assembled into two arrays. The arrays are mounted in such a way that they may be rotated on the axial member 14, by an electric motor, or by air flow due to the vehicles speed. The axial member 14 turns within the mounting member 13, which also assists in directing radar energy to the reflective arrays 11. The rotation places the reflector arrays 11 in motion relative to the vehicle on which the apparatus 10 is mounted. The rotational velocity is, in effect, partially added to or subtracted from (depending on direction of rotation) the actual velocity of the vehicle. In this way, microwave energy directed at the vehicle is returned from the reflector arrays 11 to the source of the radiation with a Doppler shift which corresponds to the combined velocities of the vehicle and the reflectors. Since the effective radar cross section of the reflector arrays 11 can be larger than that of the vehicle structure, the returned energy exhibiting the spurious Doppler shift dominates the genuine echo returned from the vehicle structure.

FIG. 4 and FIG. 5 show the apparatus in operation. The apparatus 10 is assumed to be mounted on an aircraft which is moving through space in a direction indicated by the arrows 51. The reflective arrays 11 are rotating in a direction indicated by the arrows 52. In FIG. 4, microwave radiation emitted by a distant source is indicated by the arrow 53. The arrow 54 indicated the radiation after it has been directed back to its source by the reflector array 11 and after it has acquired a Doppler shift which corresponds to the actual velocity with which the reflector array 11 is approaching the microwave source at this moment. Since this velocity is less than that of the aircraft on which it is mounted, the Doppler shift which is given to the returned radiation by the reflector array 11 is also less than that which is returned to the microwave source by the vehicle structure.

FIG. 5 indicates the mode of operation as the reflector arrays have rotated through ninety degrees (90°). At this time, operation is very similar, except that the microwave energy 54' which is to be returned to the distant source first strikes reflective surface of mounting member 13. It is directed upward to the reflector array 11, from there back to the reflective surface of the mounting member 13, and then back to the source, as indicated by the arrow 54".

Referring again to FIG. 1, apparatus 10 may be used by itself as a decoy, to simulate the presence of a moving vehicle. It may also be used on or within a vehicle to disguise the true velocity or type of the vehicle. Moreover, such apparatus 10 is immune to such anti-electronic countermeasures as spread-spectrum and frequency agile radar transmission techniques. Such uses of this apparatus 10 for decoy purposes may be both in the air and on the ground. For example, a single apparatus 10 on the ground, rotating at various speeds, could simulate, by means of induced Doppler shift and its large radar cross-section, moving armor, a low-flying aircraft or a hovering helicopter.

Among the methods of distribution of the apparatus 10 when being used as a decoy are that it can be carried by expendable drones or scattered from manned aircraft. When intended to simulate moving aircraft, device 10 could be suspended by paracute, by rotating wing, or possibly by balloon. Other possible methods of distribution include artillery and rocket. As a decoy on the ground the apparatus 10 may be used, for instance, with a large number of similar apparatus 10 distributed before and during an armored advance, thereby greatly complicating the task of defending aircraft relying on radar Doppler shift for moving target indication and ground clutter rejection.

The inventor realizes that his apparatus 10 can be further improved. For example, in an embodiment of the invention which does not use air pressure to induce effective motion of the reflectors air resistance to the rotating reflectors may be minimized by constructing the reflectors of metal mesh or by enclosing the rotating parts in a radar-permeable shroud, which might rotate with the reflectors, although this may result in some degradation of the directivity of the reflected beam, because of refraction through the curved shroud.

Also, various polarization, amplitude, and frequency effects may be introduced into the reflected signal by the use of various types and numbers of reflectors. The radar signature of a vehicle can thereby be simulated or altered.

The inventor has also discovered a use of a dielectric material which reduces the size of the apparatus 10. Each reflector 11 is filled with or is embedded within a dielectric material, which functions to slow the passage of the radiation to be reflected, thereby reducing its wavelength. The size of the required reflector 11 is therefore also reduced.

U.S. Pat. No. 4,101,736, entitled Device for Increasing the Compliance of a Speaker Enclosure, issued to Eugene J. Czerwinski on July 18, 1978, teaches a similar use of a gas having a gamma less than 1.4 and the product of its density and the square of the speed of sound herein less than the same product for air in a soft, pliable bag thereby increasing the acoustical size of the speaker without increasing the physical size of the speaker.

If the apparatus 10 consists of a rotating body of such dielectric material within which the reflectors 11 are embedded, air resistance would be reduced without the use of a separate shroud.

Although the inventor has specified a trihedral corner reflector 11 for directing a radar beam back to its source, other reflectors for a variety of wave propagating energy including light, other electro-magnetic energy, sound, and any other forms of wave propagating energy may be incorporated into an embodiment of the present invention. For example the apparatus 10 would include a mirror reflector in order to reflect light, an acoustic reflector in order to reflect sound and a corner reflector or Luneberg lens to reflect microwave energy.

Figure 6:
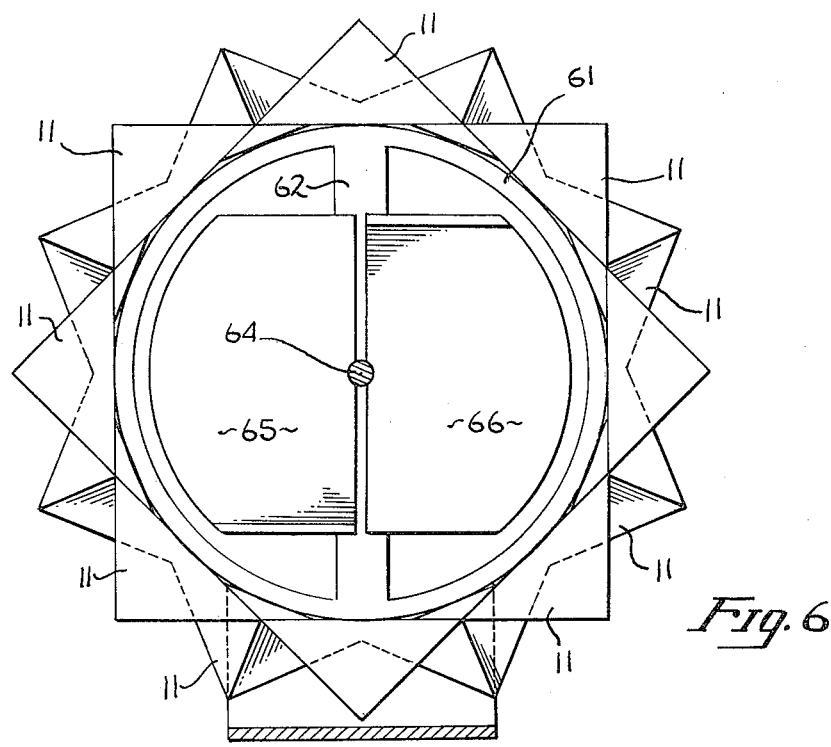
FIG. 6 is a front elevation view of an apparatus for producing a change of the frequency of a wave propagating signal which has been constructed in accordance with the principles of the second embodiment of the present invention.
Figure 7:
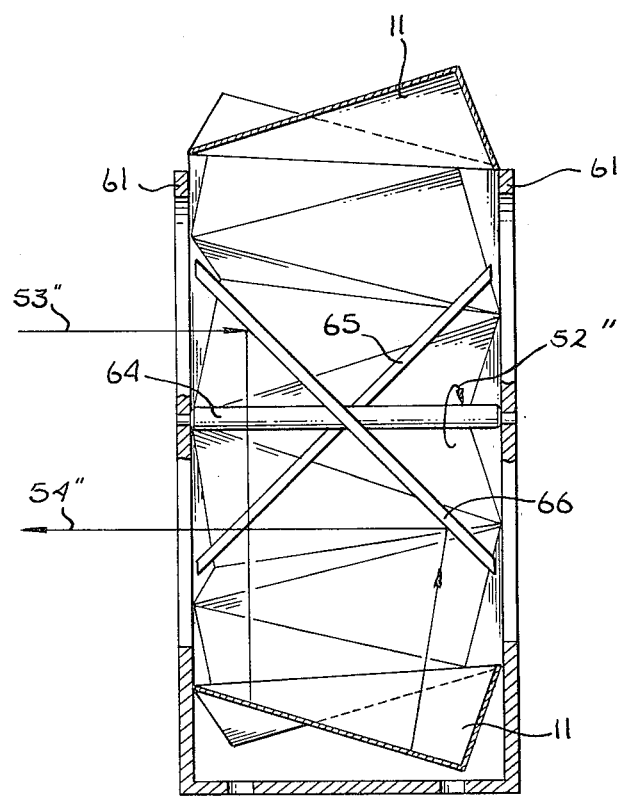
FIG. 7 is a cross-sectional view of the apparatus for producing a change in the frequency of a wave propagating signal of FIG. 6.

Referring to FIG. 6 in conjunction with FIG. 7 a second embodiment of the present invention includes a plurality of self-directing reflecting devices which are a plurality of trihedral corner reflectors 11 and a drum member 61 on which the plurality of trihedral corner reflectors 11 are mounted. The second embodiment also includes a pair of cross members 62 each of which is disposed at each end of the drum member 61 and an axial member 64 which is rotatably coupled to the cross members 62. The second embodiment further includes a first blade 65 and a second blade 66 each of which is rigidly coupled to the axial member 64 and disposed orthogonally to the other blade so that the incoming wave propagating energy is reflected onto the plurality of trihedral corner reflectors 11 along the path indicated by the arrow 53" and so that the reflected wave propagating energy travels along the path indicated by the arrow 54".

The key principles of the present invention are to induce a Doppler shift into the reflected signal by effectively moving the reflector relative to the source of the wave propagating energy, and to reflect the energy directly back toward its source, without dispersal in other directions. The relative motion may also be oscillating from side to side or from front to back.

Accordingly it is intended that the foregoing disclosure and showing made in the drawing shall be considered only as an illustration of the present invention. Furthermore it should be noted that the sketches are not drawn to scale and that distances of and between the figures are not to be considered significant. The invention will be set forth with particularly in the appended claims.

What is claimed is:

1. An apparatus for producing a frequency change of wave propagating energy wherein said apparatus is mounted on a moving structure, said apparatus comprising:

a. self-directing reflecting means for reflecting the wave propagating energy which is stationary relative to said moving structure;
   b. intermediate reflecting means for reflecting the incoming wave propagating energy from its source toward said self-directing reflecting means and reflecting the outgoing wave propagating energy from said self-directing reflecting means back toward its source; and
   c. rotating means for rotating said intermediate reflecting means about an axis which is parallel to the direction of travel of the wave propagating energy with said self-directing reflecting means being radially disposed about the axis of rotation of said intermediate reflecting means whereby said self-directing reflecting means is effectively moving toward or away from the wave propagating energy in relation to the structure on which said apparatus is mounted while reflecting the wave propagating energy back to the source thereof.

2. An apparatus for producing a frequency change of wave propagating energy according to claim 1 wherein said self-directing reflecting means is a plurality of trihedral corner reflectors.

* * * * *